Oct. 24, 1967  E. O. SCHULZ  3,348,933
METHOD FOR MAKING FOAM GLASS
Filed April 29, 1964

INVENTOR.
ERNST OTTO SCHULZ

United States Patent Office 3,348,933
Patented Oct. 24, 1967

3,348,933
METHOD FOR MAKING FOAM GLASS
Ernst Otto Schulz, Neuhaus am Rennweg, Germany, assignor to VEB Schaumglaswerk Taubenbach, Kreis Neuhaus am Rennweg, Germany
Filed Apr. 29, 1964, Ser. No. 364,066
4 Claims. (Cl. 65—22)

The present invention relates to a method and apparatus for making foam glass from a mixture of ground glass and substances that react when heated to form gas or that react during the formation of gas, and that swell up when the heat supplied is further increased to produce foam glass.

In preceding known methods of making foam glass difficulties have been encountered when molds filled with the foam glass are cooled. These difficulties arise chiefly from the fact that more than 90% of the total volume of the foam glass made in these known methods consists of occluded gas, and the foam glass tends to shrink in accordance with the gas laws while it is still in a soft condition. Unless appropriate preventive measures are taken, foam glass blocks produced by these known methods will vary considerably in their measurements and will therefore have different weight per unit volume ratios so that their sale and use is curtailed, leading to substantial financial loss.

Methods are also known which seek to remove the aforementioned difficulties by taking into consideration the relationship of the required temperature for carrying out the sintering and foaming reaction to the selected glass composition. In particular, a method is known in which a finely ground mixture of glass and 0.1 to 0.2% gas soot or 0.5 to 2% lampblack and 0.1 to 0.5% of antimony trioxide is sintered at a temperature at which gas-forming reactions do not as yet occur between the components of the mixture. The temperature is then increased to cause intensive gas formation and rapid filling of a block mold with foam glass.

While in this condition, the contents of the block mold are suddenly cooled to a predetermined low temperature between the glass sintering and transformation temperatures so that a firmly shaped outer layer is formed within which the foam production is confined. This low predetermined temperature is maintained for a suitable period to achieve an increase in thickness of the solidifying outer layer of the glass block that is formed, while in the interior thereof gas pressure is maintained at a level decreasing in direction from the interior to the exterior of the block. The antimony trioxide (or arsenic trioxide or the like) which is a component of the mixture assists in decreasing the shrinkage tendency of the foam glass, and the foam production in the interior of the glass block continues until the surface of the block is cooled sufficiently.

In the aforementioned known methods of making foam glass the essential characteristics consist of filling a block mold for example with foam glass at a maximum or peak temperature, then by suddenly cooling to a lower temperature, for example 623° C., and maintaining the foam glass at that temperature for a predetermined period, there is formed a semisolid outer layer which grows thicker with increasing time lapse. To prevent shrinkage, the foam formation in the interior of the glass block is continued until the block solidifies so that the expected consequences of the cooling operation are compensated for. To this end, oxidizing agents such as arsenic trioxide or antimony trioxide are added to the initial mixture.

Another method of making foam glass is known in which, to prevent shrinkage, the surface layer of a foam glass block is solidified by rapid cooling thereof to a temperature of 400 to 500° C. It has been asserted that in this known method the change of the finished foam glass from the foaming temperature to the stabilizing temperature occurs rather rapidly, as otherwise the heat accumulating within the block would promote the advancement of the foaming operation even during the time in which the stabilizing operation is supposed to take place.

This type of heat treatment is brought about by two independently operating tunnel kilns or furnaces which are connected to each other solely by conveyor members. The unheated zone of the conveyor members has been provided purposely to cool the foam to a temperature of 400 to 500° C., and has been constructed in such a manner that cooling air as needed can be suitably supplied through ventilating flaps. While solidifying at the surface, the foam glass block is subsequently introduced into a stabilizing furnace to produce an equalization between the temperatures of the cooled surface and the central regions of the block.

The objective of these known methods was that the heat treatment in the zones of the tunnel kiln where foaming occurs is maintained until the mold is filled with foam glass and as soon as the mold moves out of these zones, intensive cooling takes place which interrupts the foaming operation.

The expected results of the aforedescribed known method of preventing shrinkage of falling-in of the foam material are incomplete and uncertain. The rate at which the foam forms depends on the temperature and the glass toughness as well as the chemical reaction capability of the starting mixture. The aforedescribed known method, however, fails to take these factors into consideration.

Generally the foam formation initially increases with great rapidity at constant temperature; the tempo of increase slows down, however, after a period and finally ceases when the foaming force is exhausted. The activity of the foam-producing starting mixture can be controlled or regulated by selection of ground glass with suitable properties, particularly with a sufficient $SO_3$ content and a selected amount of reducing carbon, and also by the fineness of the ground glass particles.

In the known methods the foaming force is not completely exhausted when the mold has been completely filled and the rate of foam formation is still relatively high at that time. A further increase in the foam volume exceeding the volume of the mold is prevented by sudden and rapid cooling. The cooling takes place at the very moment the mold is full, the filling operation having been maintained at a maximum temperature. Since in this condition the foam-forming rate is still rather high, small unavoidable variations in the prescribed temperature-time program occur so that at this moment either the mold is not completely filled, or contrariwise, foam overflows and gushes from the mold joints and the mold possibly becomes distorted by the high inner pressure. Consequently the foaming material becomes so firmly jammed into the mold that the formed glass block cannot be removed from the mold or can be removed with only great difficulty. Furthermore, the ridge which forms from the foam material forced out of the mold interferes with the further processing. In such a case, variations occur in the prescribed weight per unit volume of the foam glass blocks as well as an increase in the waste during the finishing of the blocks.

According to one known method, the foam-filled mold is cooled rapidly from maximum temperature to a temperature lying between the sintering and transformation temperatures and is maintained at that temperature for a period during which a semisolidified shell is formed without further volume increase and determine the final shape of the block.

The contraction or decrease in volume which occurs with temperature decrease is compensated by the continuation of foam formation in the center of the material, resulting in a pressure balance between the opposing forces of contraction and expansion.

It can be demonstrated that the foaming material shrinks due to volume contraction upon being rapidly cooled, a characteristic that cannot be prevented according to physical laws. The foam which continues to form in the interior of the block after the outer walls have solidified is no longer in a position to reverse the shrinkage that has already taken place so that the outer shape remains as is.

Apparatuses for carrying out the known methods are built in accordance with known furnace construction principles and generally exhibit disadvantages such as the appearance of disturbances in the desired temperature sequence due to the balancing of the heat within the heating chamber, further-on in the heat transfer provided by the molds, and in the difficulty in controlling or adjusting the furnace due to its heat inertia or retentivity.

It is accordingly an object of the present invention to provide a method and apparatus for producing foam glass in which a controllable and positively filled condition of the molds is achieved without any adverse effects and in which shrinkage during the cooling operation is avoided by suitable temperature control.

To this end and in accordance with various aspects of the invention there is provided a method of making foam glass in a mold which includes the steps of heating a starting mixture of glass and a gas-producing foaming agent at a predetermined heating temperature to form a foaming mass, and slowly cooling the foaming mass before the mold is completely filled with the same to a predetermined cooling temperature at which flow of the foaming mass is substantially stabilized. The volume of the foaming mass increases during the slow cooling until the mold is filled, and the tendency of the foaming mass to decrease in volume as the heating temperature is decreased to the cooling temperature is compensated by continued gas production in the interior of the foaming mass.

With regard to the above-mentioned predetermined cooling temperature, those of a higher order, of about 50° C., are meant than the transformation temperature $T_g$ of the glass employed. Should, for example, a glass be selected for a basis the composition of which is identical to that of a commercial window pane with a $T_g$ of about 530° C., then the effect aimed at can be brought about up to a temperature of 580° C.

In accordance with another aspect of this invention the foam producing starting mixture includes $SO_3$ as the sole oxygen carrier or oxidizing agent in an amount of at least 0.45% by weight.

In accordance with a further aspect of the invention the mixture of glass and foaming agent is so constituted that the foam forming ability of the foaming agent is exhausted only when the cooling temperature at which the flow of the foaming mass is substantially stabilized is reached.

It should be added that with the manufacture of foam glass the starting point is a "froth system," i.e. a powdery stock of finely ground glass and a reactive carbon, as, for example, gas soot. The chemical activity is the result of gas-forming reactions sustained by the reciprocal action of sulfur trioxide ($SO_3$), bound chemically in the glass, and carbon. The proportion of carbon in such froth systems ranges, e.g., between 0.08 and 0.3%. Moveover, this system, consisting of glass and soot, must be brought through grinding to as large a surface as possible, 7000 cm.²/g. for instance, so as to be able to reach the necessary degree of reactivity.

By activity of the frothable system the magnitude of the froth mass obtainable from 1 kg. of said system is meant in proportion to the time within which it develops. Said activity is a function of the amounts of $SO_3$ and carbon contained in the system. It is furthermore a function of the specific surface of the frothable initial stock and of the viscosity of the glass, and thus physically and chemically dependent to an increased degree on the temperature course in time.

It is possible, for example, to determine two starting points by altering the aforementioned conditions which both yield so much froth as necessary in the process for filling the mold, whereat one system starts with a very fast and precipitous swelling which then dies down with time progressing, while in the other instance such an intensive activity can be selected as to reach very quickly the desired froth volume.

In the practice of foam glass manufacture prevailing at present, foam development is not pushed to exhaustion. Therefore, in the condition of filling up the mold volume with foam, the mass of foam will still possess a certain, more or less large, reserve in moving force. In the case of the example of a highly active frothing stock, foam development will continue after filling up the mold at relatively high velocity, while with a moderately active system speed will be damped. In the first-mentioned case a continued peak temperature, e.g. 850° C., will thus have a much more marked effect than in the case of a stock having lesser activity.

It can, therefore, be stated that the activity of the initial foaming mixture is adjusted so as to permit that the filling up of the last volume portions of the mold takes place at a slower rate, yet it follows its course even when the temperature will fall in the manner as will be described hereinafter in more detail.

In accordance with yet other aspects of the invention there is provided an apparatus for making foam glass in a mold which includes a tunnel kiln having a heating chamber extending through it. An exhaust or waste gas flue communicates with the heating chamber and divides the same into a first externally heated heat region of relatively high and increasing predetermined temperature and a second heat region of partly decreasing and partly lower stabilized temperature. Conveyor means are also provided for advancing molds containing foam glass producing starting mixture through the heat regions of the heating chamber in direction from the first to the second region, the molds being heated and the starting mixture being sintered and foamed in the first heat region.

The waste gases are derived from the exhaust-gas ventilator and are led into the respective furnace zones over a pipe system whereinto throttle valves are built serving as adjusting mechanisms. The adjustment is effected by intercalating a regulating thermo-couple beween the furnace zones or sections. The thermo-couple can influence the throttle valve by the intermediary of appropriate control mechanisms.

In accordance with another aspect of the invention the first region of the heating chamber is flame-heated, and conduit means communication with the flue and the heating chamber feeds hot exhaust gases that have left the chamber back into the chamber in direction from the second region toward the first region for heating the molds in the first region.

In accordance with still another aspect of the invention an air preheater is located between the heating chamber and the exhaust gas flue so as to heat the correspondingly cooled exhaust gas stream which is reintroduced into the heating chamber.

The novel features which are considered as characteristic for the invention are set forth in particular in the appended claims. The invention itself, however, both as to its construction as an apparatus, and as an improved method, together with additional objects and advantages thereof will be best understood from the following description thereof when read in conjunction with the accompanying drawings in which:

Figure 1:
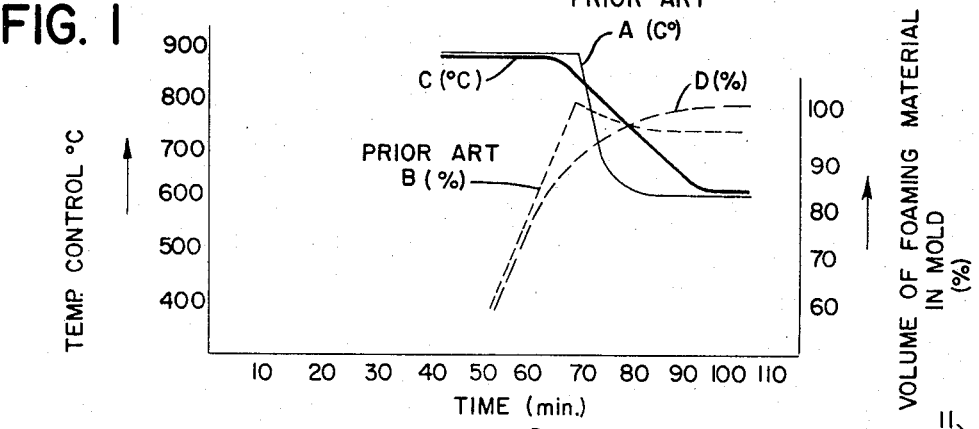
FIG. 1 is an explanatory graph showing the temperature control as well as the development of the volume of foaming material with respect to time, both in the previously known and the inventive methods.

Referring now to the drawings and particularly to FIG. 1, the lines A and C express the temperature development or course and the lines B and D, applied to the second set of coordinates on the right hand side of the figure, express the extent to which the molds are filled with foam glass. The thin solid line A and the thin broken line B represent the mode of operation of the previously known methods, while the thick solid line C and the thick broken line D refer to the mode of operation of the method of this invention. Owing to the superimposed arrangement of the graph curves, specific temperature values can easily be established for any moment of the process, and any degree of mold filling. The temperature control for heating and sintering is not important in this connection.

Line A considered in connection with line B shows that, according to the known methods, the mold is filled at the instant that the temperature is decreased. At this instant, as can be inferred also from the course of line B, the rate of foam formation is still quite high, resulting in the aforementioned disadvantages.

Beginning from the high point of the line B which represents the complete filling of the mold, the outer region of the foam glass is not in such a position to solidify rapidly as would appear to be necessary according to the cooling curve. Thus, the volume contracts for a while longer and creates a shrinkage or falling-in of the foamed glass surface as is shown by the line B.

With the method of this invention the cooling-off phase according to the line C occurs after the mold according to the line D has just been filled to about 80% of its volume.

The molds are driven into the continuous-type furnace at a temperature of about 30° C. Then they are heated according to the exponential curve C up to a peak temperature of about 850° C. In the second furnace zone the molds filled up with glass foam will finally be cooled to a constant temperature of about 600° C.

Further cooling-off is then so controlled that the foam formation rate is slowed down although the overall amount of foam increases. Complete filling of the mold occurs only when the foam glass assumes a relatively low temperature at which the flow has become practically stabilized, e.g., 600° C. The instants of achieving flow stabilization and of filling the mold approximately coincide.

At stabilization temperature, ranging above $T_g$, the foam-glass block keeps its shape although the mass of glass foam is not yet in a solid condition.

Only so much foam glass is formed with this temperature treatment as is necessary to fill the molds and compensate for volume contraction.

Due to the rather slow filling of the mold in the method of the present invention as compared to the known old methods, and due to the characteristic course of the line D following cooling-off (as shown in line C), fluctuations of temperature control within permissible limits no longer affect the operation to such a degree, as it occurs in the known methods, so that the filling of the mold will be sure to occur in a well defined manner.

With the instant invention, rapid formation of a semi-solidified outer skin is avoided as the foamed glass is changed relatively slowly from a condition of lower viscosity to a condition of practically rigid shape so that the gas formation, that is continuously maintained during this time interval, will cause foaming sufficient to completely fill the mold with material.

In the continuous production of foam glass in molds, longer-lasting fluctuations of the foam production rate are not entirely avoidable. They can occur, for example, through change in the composition of the atmosphere in the chamber during sintering, and also because of deviations in the heating value of the fuel which cannot be taken care of by regulating devices. It is therefore advisable to make adjustments to such variations immediately during the course of the mold filling.

In the following, a detailed description will be given of an embodiment of a furnace or kiln for carrying out the process according to the invention, but it should be understood that this is only given by way of illustration and not of limitation.

Figure 2:
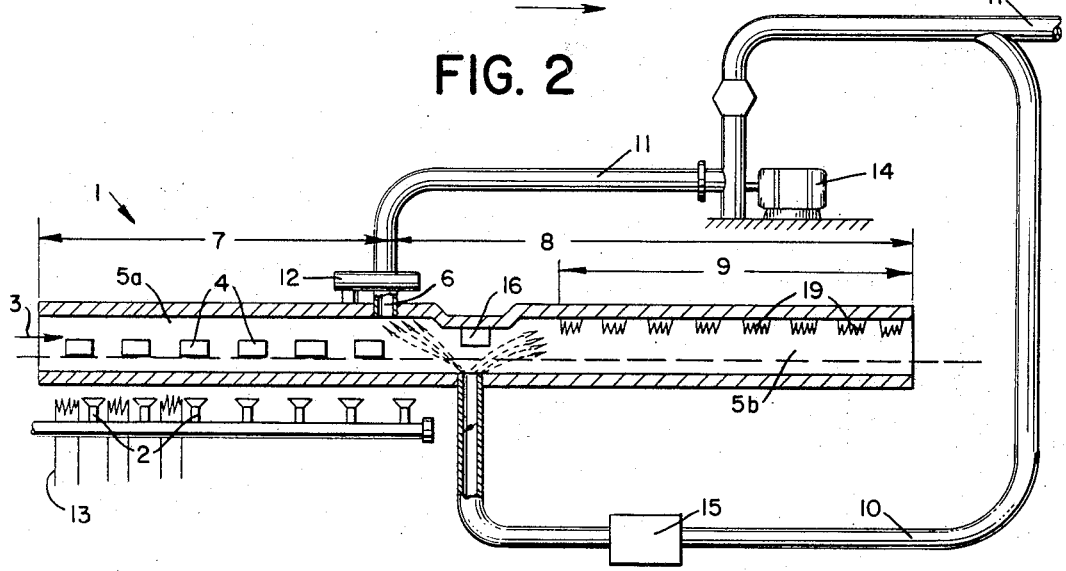
FIG. 2 is a somewhat schematic view of a furnace or kiln embodying the apparatus of this invention.
Figure 3:
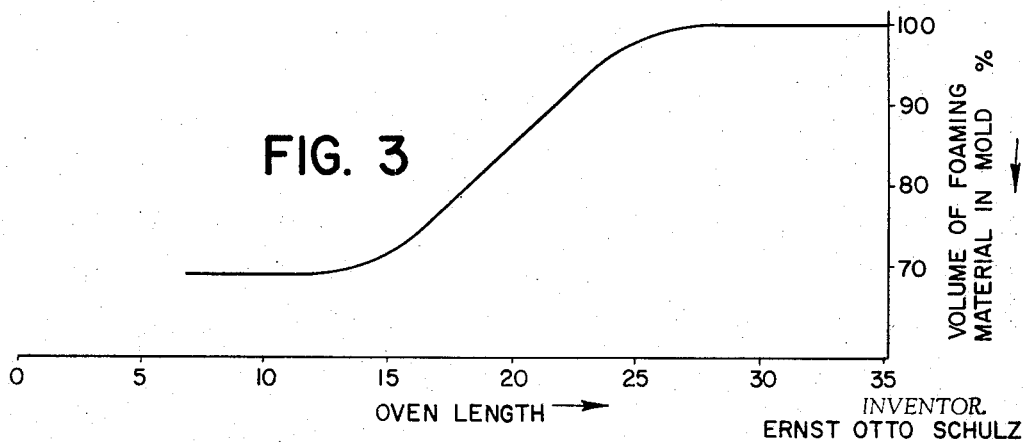
FIG. 3 shows a graph corresponding to FIG. 2 which visualizes the development of the volume of foaming material with respect to the temperature control and the furnace tunnel length.

The furnace, as shown in FIG. 2, is generally designated by 1; it includes a continuous heating chamber 5a, 5b, which extends through the entire length of the furnace and comprises two zones of different temperatures: a heating zone proper designated by 7 and a zone 8 of steadily decreasing temperature. The heat in zone 7 may be supplied by direct flame heating, e.g. by a row of gas burners 2. In zone 8, a number of radiating elements 19 are provided. At the end of zone 7, a stack 6 is provided for withdrawal of exhaust gases from the heating zone.

A conveyor 3 of suitable construction, such as an endless belt of a material that can withstand the temperatures in the heating chamber, shown diagrammatically by a broken line, is movable through the heating chamber 5 carrying molds 4 which contain a starting mixture of ground glass and foam producing material. The heat required in zone 7 is supplied by direct flame heating, e.g. by gas burners.

Temperature regulation is effected in furnace zone 7 by means of sets of burners 13 provided to the right and to the left if viewed in inbound direction, in addition to the burners 2 already mentioned. Said burners are located in the bottom portion of the furnace, as schematically shown, and disposed beneath the steel cylinders 3 serving for effecting transportation. The burners 13 are set according to the desired temperature curve, whereafter they are automatically adjusted.

Tempering is effected in furnace zone 9 through the electro-heated units 19 the adjustment of which is effected in a manner known per se. The heating of zone 9 may occur in two different ways. Electro-heating is provided, as a matter of example. The elements may be the heat radiators 19 which are embedded in ceramic tubes disposed above and below the passing molds. Heating is necessary for compensating for the furnace losses and/or for adjusting the temperature course.

Between the heat zone 7 and a radiantly heated portion 9 of zone 8 (in which any suitable heat radiators, shown diagrammatically at 19, may be employed), a stream of hot exhaust gases is introduced through a tube 10 in the direction of zone 7. These exhaust gases stream against the molds 4 which are moving in the direction of the arrow, and leave the heating chamber 5 together with the exhaust gases from zone 7 through the stack 6. However, if desired, the gases emerging from tube 10 may also be fully or partly returned to zone 8 through tube 10.

The quantity of exhaust gas that can be conducted into the furnace space located between zones 7 and 8 depends on (a) the amount of exhaust gas led in through the throttle valve 15, and (b) the heating-chamber pressure within furnace zone 7.

These exhaust gases are circulated in a known manner through the exhaust gas tube 11 and conveyed through a ventilator 14. If, for example, heating-chamber pressure is set to a vacuum (underpressure) in this zone, the amount necessary for the equalization is obtained through the exhaust tube 11 from the returned flue gas. Should, however, the amount of the restored flue gas be larger than the quantity corresponding to said underpressure, then an adjustable portion is led to furnace zone 8.

The conduit 10 consists of a tubing of a smaller nominal width than that of exhaust gas tube 11.

To regulate the exhaust gas temperature suitably, the exhaust gases are led appropriately into an air preheater 12 after leaving the exhaust gas flue 6. The arrangement is based on the principle of an exhaust gas circulation, in which the exhaust gases are rapidly adjustable or changeable according to volume and heat capacity.

The exhaust gases from the foam furnaces leave the heating place at a relatively high temperature (above 600° C.). For pre-heating the furnace air serving for the burners of the furnace zone 7, the needle-type air pre-heater 12 is disposed. In regular operation, constant exhaust gas temperatures will normally develop. However, the temperature of the exhaust gas can be modified by pre-heating only a more or less large portion of the combustion air, while the rest can be supplied to the burners in the form of cold air.

The exhaust gases serve for the adjustment of the temperature drop between the furnace zones 7 and 8. The operation is carried out normally by employing full air pre-heating and by influencing temperature gradation through the last gas burners of furnace zone 7 and the first burners of furnace zone 8 having radiators 19 therein. Merely for a more precise setting of the temperature course, the adjustment may be disposed (in a manner not illustrated) within the recycling tube 10.

The hot exhaust gases, whose temperature naturally lies below the temperature of zone 7, permit practically inertialess regulation of the temperature when variations from the nominal course occur, the temperature according to the method of the present invention decreasing steadily and being maintained at a constant level during the course of the foam formation. It is thereby possible to hold constant the degree to which the molds are filled, or to correct them rapidly upon variations.

After leaving the operating region of the circulated or returned hot exhaust gases, the molds and their contents in the course of the zone 8 are cooled off by a finely regulated heat removal operation to a predetermined temperature, at which the foamed glass becomes flow stabilized and volume contraction can occur no longer.

The pipe 10 leads the waste gases from the exhaust-gas ventilator 14 into the respective furnace zones 7, 8. The throttle valve or valves 15 are built into pipe 10 so as to serve for adjustment. This may be done by way of a regulating thermo-couple 16 interposed between the furnace zones 9 and 7, as shown in FIG. 2. The thermocouple 16 may act on the throttle valve 15 by the intermediary of appropriate control devices (not shown).

The molds are not entirely filled in furnace zone 7, because filling up occurs only considerably later at decreasing temperatures, more particularly upon the mold passing into the furnace zone 9 heated by elements 19.

It is claimed:
1. A method of making foam glass in a mold, comprising the steps of: mixing finely-divided glass and a gas-producing foaming agent; heating the mixture in a mold to foaming reaction temperature; discontinuing the heating at a point where the mold is not completely filled; initiating slow cooling of the foaming mass; continuing gas production within the foaming mass, to cause the foaming mass to increase in volume during said cooling; and completing the slow cooling process to reach the temperature at which flow of the foaming mass is substantially stabilized approximately coincident with the complete filling of the mold by the foamed mass.

2. The method as described in claim 1, in which said mixing is done with a gas-producing foaming agent comprising sulfur trioxide in an amount of at least 0.45 percent by weight.

3. The method as described in claim 2, in which the heating is discontinued at a point where the mold is approximately 80 percent filled by the foaming mass.

4. The method as described in claim 3, in which the completion of slow cooling is brought to a flow-stabilized temperature of the foaming mass of approximate 580° C.

References Cited

UNITED STATES PATENTS

| | | | |
|---|---|---|---|
| 2,123,536 | 7/1938 | Long | 65—22 |
| 2,337,672 | 12/1943 | Long | 65—22 X |
| 2,544,954 | 3/1951 | Ford | 65—22 |
| 2,600,525 | 6/1952 | Ford | 65—22 |
| 3,163,512 | 12/1964 | Schill et al. | 65—22 |

DONALL H. SYLVESTER, *Primary Examiner.*

F. W. MIGA, *Assistant Examiner.*